United States Patent
Nanba

(10) Patent No.: US 6,813,091 B2
(45) Date of Patent: Nov. 2, 2004

(54) ZOOM LENS SYSTEM AND PHOTOGRAPHING APPARATUS HAVING THE SAME

(75) Inventor: Norihiro Nanba, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/441,742

(22) Filed: May 19, 2003

(65) Prior Publication Data

US 2003/0218806 A1 Nov. 27, 2003

(30) Foreign Application Priority Data

May 21, 2002 (JP) ....................... 2002-145535

(51) Int. Cl.⁷ .............................................. G02B 15/14
(52) U.S. Cl. ................. 359/689; 359/680; 359/682; 359/684; 359/784; 359/753
(58) Field of Search ................. 359/676, 680, 359/682, 684, 689, 784, 753

(56) References Cited

U.S. PATENT DOCUMENTS

| | | | |
|---|---|---|---|
| 4,647,160 A | 3/1987 | Ikemori | 359/680 |
| 4,810,072 A | 3/1989 | Takahashi | 359/689 |
| 4,824,223 A | 4/1989 | Doctor et al. | 359/689 |
| 4,838,666 A | 6/1989 | Shiraishi | 359/689 |
| 5,015,077 A | 5/1991 | Ueda | 359/689 |
| 5,270,863 A | 12/1993 | Uzawa | 359/682 |
| 5,331,462 A * | 7/1994 | Yano | 359/689 |
| 5,644,434 A * | 7/1997 | Hagimori | 359/689 |
| 5,668,668 A | 9/1997 | Shibayama | 359/683 |
| 6,137,638 A * | 10/2000 | Yamagishi et al. | 359/682 |
| 6,191,896 B1 * | 2/2001 | Itoh | 359/689 |
| 6,308,011 B1 * | 10/2001 | Wachi et al. | 396/72 |
| 6,498,688 B2 * | 12/2002 | Shibayama | 359/689 |
| 2003/0169509 A1 * | 9/2003 | Iyama | 359/680 |
| 2003/0189762 A1 * | 10/2003 | Mihara et al. | 359/680 |

FOREIGN PATENT DOCUMENTS

| | | |
|---|---|---|
| JP | 59-18917 | 1/1984 |
| JP | 61-267721 | 11/1986 |
| JP | 63-135913 | 6/1988 |
| JP | 3-288113 | 12/1991 |
| JP | 7-261083 | 10/1995 |
| JP | 8-304704 | 11/1996 |
| JP | 10-213745 | 8/1998 |
| JP | 2000-137162 | 5/2000 |

* cited by examiner

*Primary Examiner*—Evelyn A. Lester
(74) *Attorney, Agent, or Firm*—Morgan & Finnegan, LLP

(57) ABSTRACT

This invention provides a zoom lens system with, in succession from the front to rear, a first lens unit of negative optical power, a second lens unit of positive optical power and a third lens unit of positive optical power. When zooming from a short focal length end to a long focal length end, the second lens unit moves forward, while the third lens unit moves along a locus that is located rearmostly at other zoom position than the short focal length end and that is convex toward the image side or a part of it. The first lens unit does not move. Further, the first lens unit has a negative lens with a concave rear surface, and a positive lens with a convex front surface. The second lens unit has a negative lens with a concave rear surface, and a positive lens disposed rearwardly of the negative lens.

9 Claims, 17 Drawing Sheets

ZOOM LENS SYSTEM AND PHOTOGRAPHING APPARATUS HAVING THE SAME

BACKGROUND OF THE INVENTION

1. Field of the Invention

This invention relates to a zoom lens suitable for the photographing optical system of a photographing apparatus using a solid state image pickup device such as a CCD sensor or a CMOS sensor.

2. Description of Related Art

With the higher function of a video camera, an electronic still camera or the like using a solid state image pickup device, there is desired the compatibility of high performance and compactness.

In the camera of this kind, it is necessary to dispose various optical members such as an optical low-pass filter and a color correcting filter between the rearmost portion of a lens system and the image pickup device and therefore, a lens system having a relatively long back focal distance is required. Further, in the case of a camera using an image pickup device, in order to avoid shading, there is desired a lens having a good telecentric characteristic on an image side, that is, having an exit pupil sufficiently separate from an image plane.

As a compact zoom construction, there have heretofore been proposed various zoom lenses of a so-called short zoom type having two lens units of negative-positive refractive power. In these optical systems of the short zoom type, a second lens unit of positive refractive power is moved to thereby effect a magnification variation, and a first lens unit of negative refractive power is moved to thereby effect the correction of an image point position resulting from the magnification variation. Further, mention may be made of examples in which for higher performance and downsizing, as described in Japanese Patent Publication No. 07-3507 (corresponding U.S. Pat. No. 4,810,072), Japanese Patent Publication No. 06-40170 (corresponding U.S. Pat. No. 4,647,106), etc., a third lens unit of negative or positive refractive power is disposed on an image side to thereby effect aberration correction. These lens systems, however, are designed chiefly for 35 mm film photographs and therefore can hardly be said to be compatible in a back focal distance and a good telecentric characteristic required of an optical system using a solid state image pickup device.

As a zoom lens system satisfying a back focal distance and a telecentric characteristic, mention may be made of an optical system comprising three lens units of negative-positive-positive refractive power described in Japanese Patent Application Laid-Open No. 63-135913 (corresponding U.S. Pat. No. 4,838,666), Japanese Patent Application Laid-Open No. 07-261083, etc., but this optical system has suffered from the defects that the number of the constituent lenses of each lens unit is relatively great, that the full length of the lens is great and that the manufacturing cost is high.

Also, in the example described in Japanese Patent Application Laid-Open No. 07-261083, a first lens unit of negative refractive power is moved to thereby effect focusing on a short-distance object and therefore, coupled with the movement for zooming, there has been the defect that mechanical structure is complicated.

Also, U.S. Pat. No. 4,999,007 discloses a zoom lens system comprising three lens units of negative-positive-positive refractive power in which each of a first lens unit and a second lens unit is comprised of a single lens. This zoom lens system, however, has suffered from the defect that the entire lens system becomes large because the full length of the lens at the wide angle end is relatively great and further the first lens unit and a stop at the wide angle and are greatly separate from each other and therefore the incidence height of an off-axial ray is great and the diameter of a lens constituting the first lens unit is increased. Also, the number of the constituent lenses of each of the first lens unit and the second lens unit is one and therefore, aberration correction in each of these lens units has been insufficient. Particularly, the fluctuation of transverse chromatic aberration during zooming is liable to occur in the first lens unit wherein the fluctuation of the height of the off-axial ray from an optical axis is great, but since the first lens unit is comprised of a negative lens, the correction in the lens unit is not done, and this leads to the problem that in the entire system as well, the fluctuation of transverse chromatic aberration is great.

Also, U.S. Pat. No. 4,824,223 discloses an optical system for a projector comprising three lens units of negative-positive-positive refractive power. In this lens, a first lens unit comprises a negative lens and therefore, aberration correction in the lens unit is not done and the variable power ratio is other order of 1.7.

Also, the assignee of this application discloses in Japanese Patent Application Laid-Open No. 2000-111798 (corresponding U.S. Pat. No. 6,308,011) a photo-taking lens comprising three lens units of negative-positive-positive refractive power. In this photo-taking lens, the securement of a lens back necessary for inserting a filter or the like and a telecentric characteristic necessary for a solid state image pickup device are made compatible and moreover, a relatively compact zoom lens is achieved.

In the zoom lens disclosed in Japanese Patent application Laid-Open No. 2000-111798, however, the three lens units are moved on different loci during a zooming and therefore, movable lens units are many and mechanical structure becomes liable to be complicated, and there have been problems in respect of the bulkiness of a lens barrel and cost.

As an example of a three-unit construction of negative-positive-positive refractive power in which a third lens unit is made stationary, there is the aforementioned Japanese Patent Application Laid-Open No. 07-261083, but in this example, a second lens unit is −1 in its magnification and has a zooming position in which focusing becomes impossible and therefore, it is necessary to effect focusing by a first lens unit or a third lens unit. In a case where focusing is effected by the third lens unit, there must be adopted a construction in which all of the three lens units are movable, and this leads to problems in respect of the bulkiness of a lens barrel and cost. In a case where focusing is effected by the first lens unit, the focusing becomes fore lens focusing and therefore, when the shortest image pickup distance is shortened, an increase in the diameter of the fore lens results, and therefore, there is a problem in respect of downsizing.

As examples of the three-unit construction of negative-positive-positive refractive power in which the first lens unit is made stationary, mention may be made of Japanese Patent No. 3035830 (corresponding U.S. Pat. No. 5,270,863), Japanese Patent Application Laid-Open No. 8-304704 (corresponding U.S. Pat. No. 5,668,668), Japanese Patent No. 2552861, Japanese Patent Application Laid-Open No. 10-213745, Japanese Patent Application Laid-Open No. 2000-137164 and U.S. Pat. No. 5,015,077.

U.S. Pat. No. 5,015,077 is a lens system for microfilm projection and the number of lenses is as great as the order of 13, and this leads to a problem in respect of downsizing.

In Japanese Patent Application Laid-Open No. 08-304704, magnification variation is effected by a composite system of a second lens unit and a third lens unit, and this example is of a construction in which during the zooming from the wide angle end to the telephoto end, a third lens is greatly moved toward the object side with a second lens unit, and therefore suffers from the problem that the shaft length of the third lens unit is great.

In Japanese Patent Application Laid-Open No. 2000-137164 and Japanese Patent No. 2552861, a second lens unit is comprised of one or two lenses and does not include a negative lens, and there is a problem in respect of aberration fluctuation resulting from zooming.

In Japanese Patent Application Laid-Open No. 10-213745, a second lens unit is comprised of a positive lens and a negative lens, but the positive refractive power of the second lens unit is formed by this one positive lens and therefore, as compared with a triplet or like construction, this example is inferior in aberration correction, and has a problem as a lens system particularly for a camera using a high-pixel image pickup device.

In Japanese Patent No. 3035830, a second lens unit is comprised, in succession from the object side of three positive, positive and negative lenses, and the last surface of the second lens unit is a concave surface facing the object side. A combination of this concave surface and the positive refractive power of a third lens unit has the action of keeping an exit pupil away from an image plane, but if an attempt is made to reduce the interval between the second lens unit and the third lens unit to thereby shorten the full length while keeping the exit pupil away from the image plane, it is necessary to make the refractive power of the concave surface of the second lens unit and the third lens unit great, and the correction of off-axial aberration becomes difficult and therefore, it is difficult to make the shortening of the full length and high performance compatible while keeping the exit pupil away from the image plane.

SUMMARY OF THE INVENTION

So, the present invention has as its object the provision of a zoom lens system in which a minimum number of lens units are moved to thereby effect zooming and provided a simple mechanical construction and various aberrations are corrected well over an entire zoom area and which has a short full length and is compact and yet keeps an exit pupil sufficiently away from an image plane.

In order to achieve the above object, a zoom lens system according to an aspect of the present invention is provided, in succession from the front (if in a photographing optical system, the object side) to the rear (if in the photographing optical system, the image side), with a first lens unit of negative optical power, a second lens unit of positive optical power and a third lens unit of positive optical power. In case of zooming from a short focal length end (the so-called wide angle end) to a long focal length and (the so-called telephoto end), the second lens unit is fowardly moved and the third lens unit is moved along the locus which is convex toward the image side or a part of it. In case of the zooming, the first lens unit does not move, and the third lens unit describes such a movement locus that it is located rearmostly at other zoom position than the short focal length end.

The first lens unit has a negative lens of which the rear surface is a concave surface and a positive lens of which the front surface is a convex surface. The second lens unit has a negative lens of which the rear surface is a concave surface and a positive lens disposed rearwardly of the negative lens.

Further, this zoom lens system satisfies the following condition:

$$0.7<(e12t+e23t)/(e12w+e23w)<1.4,$$

where e12w is the interval between the first lens unit and the second lens unit at the short focal length end, e23w is the interval between the second lens unit and the third lens unit at the short focal length end, e12t is the interval between the first lens unit and the second lens unit at the long focal length end, and e23t is the interval between the second lens unit and the third lens unit at the long focal length end.

DESCRIPTION OF THE PREFERRED EMBODIMENTS

Figure 1:
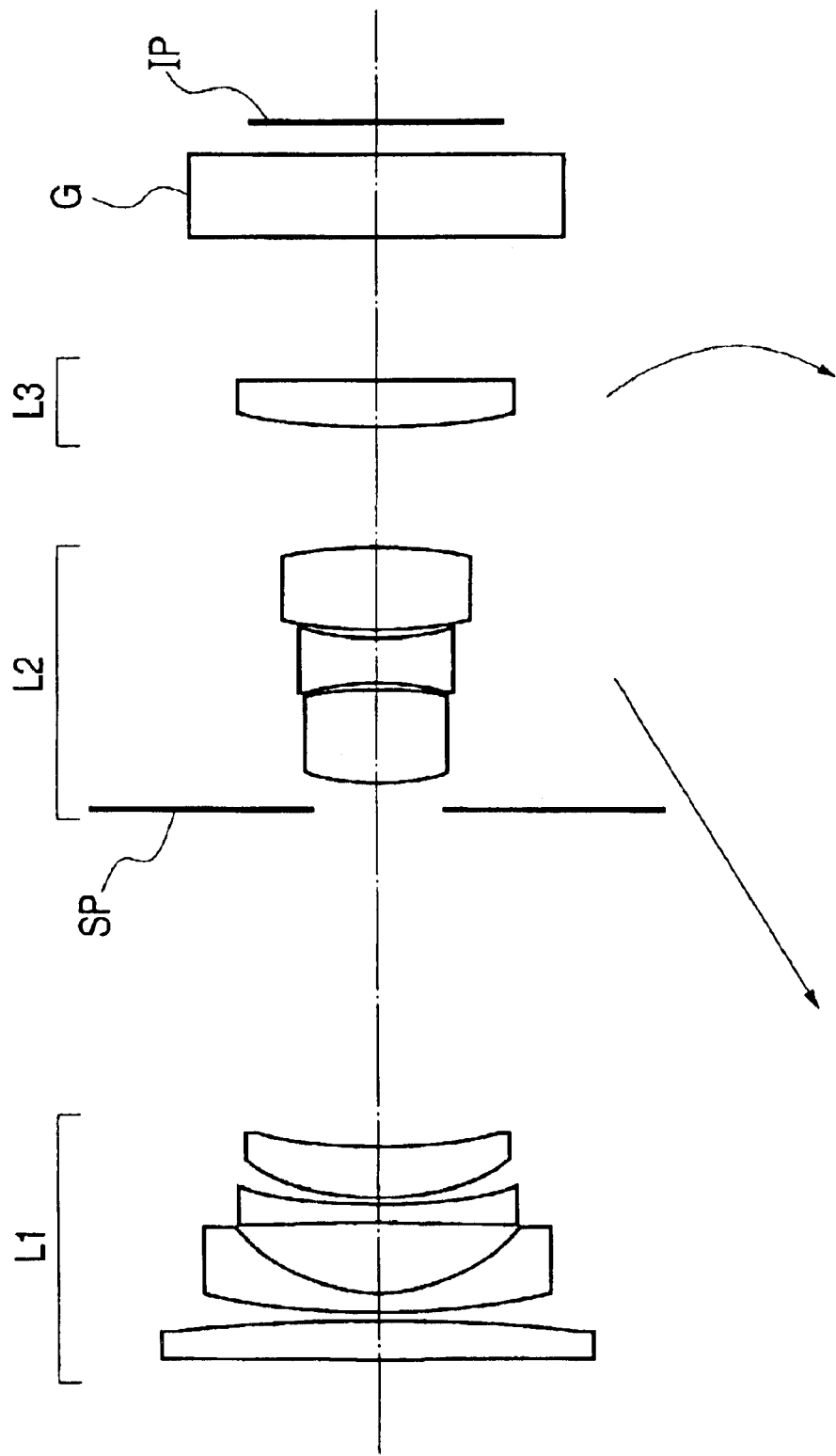
FIG. 1 is an optical cross-sectional view of the zoom lens of Numerical Embodiment 1.
Figure 2:
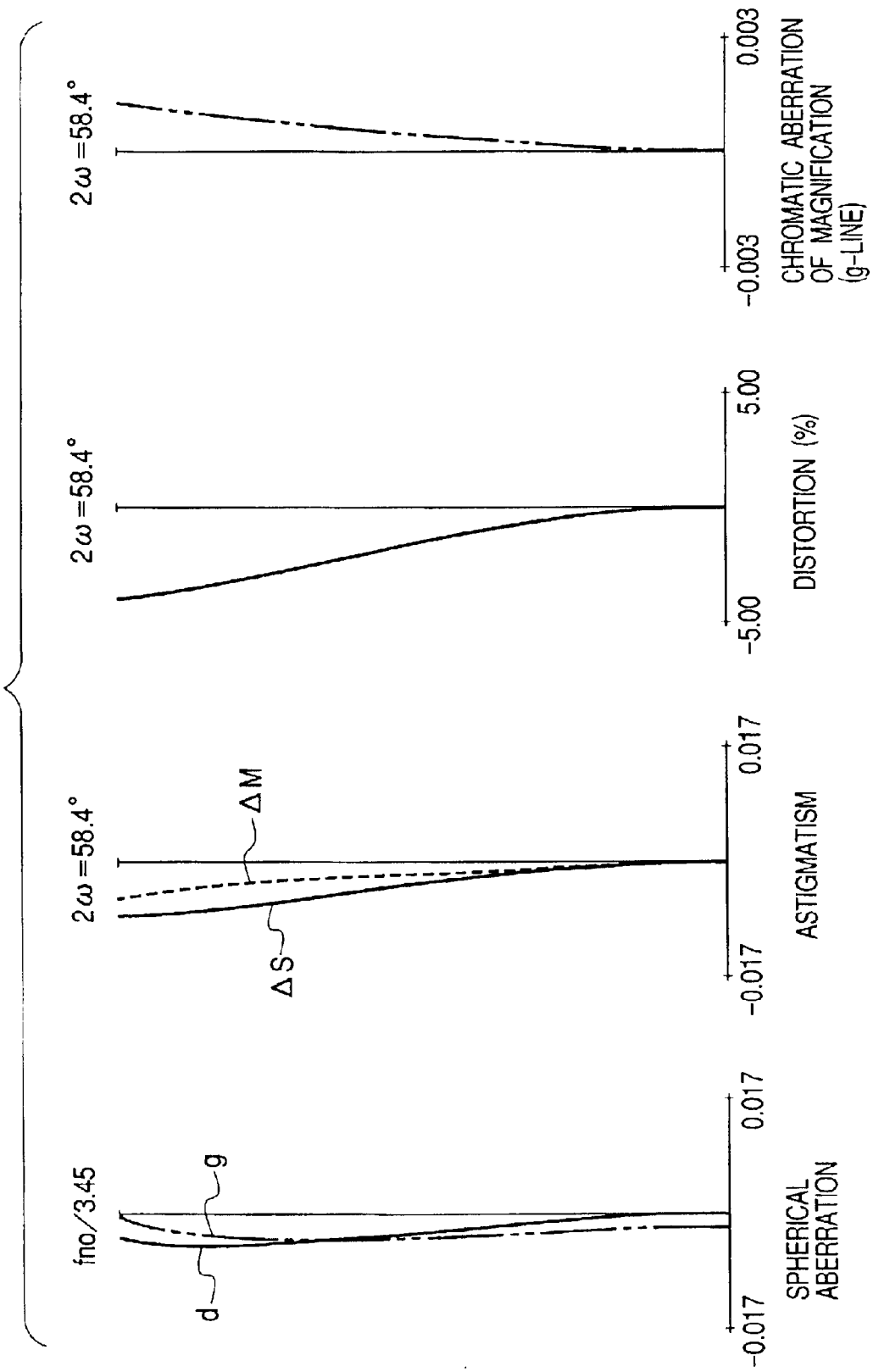
FIG. 2 shows aberrations at the wide angle end of the zoom lens of Numerical Embodiment 1.
Figure 3:
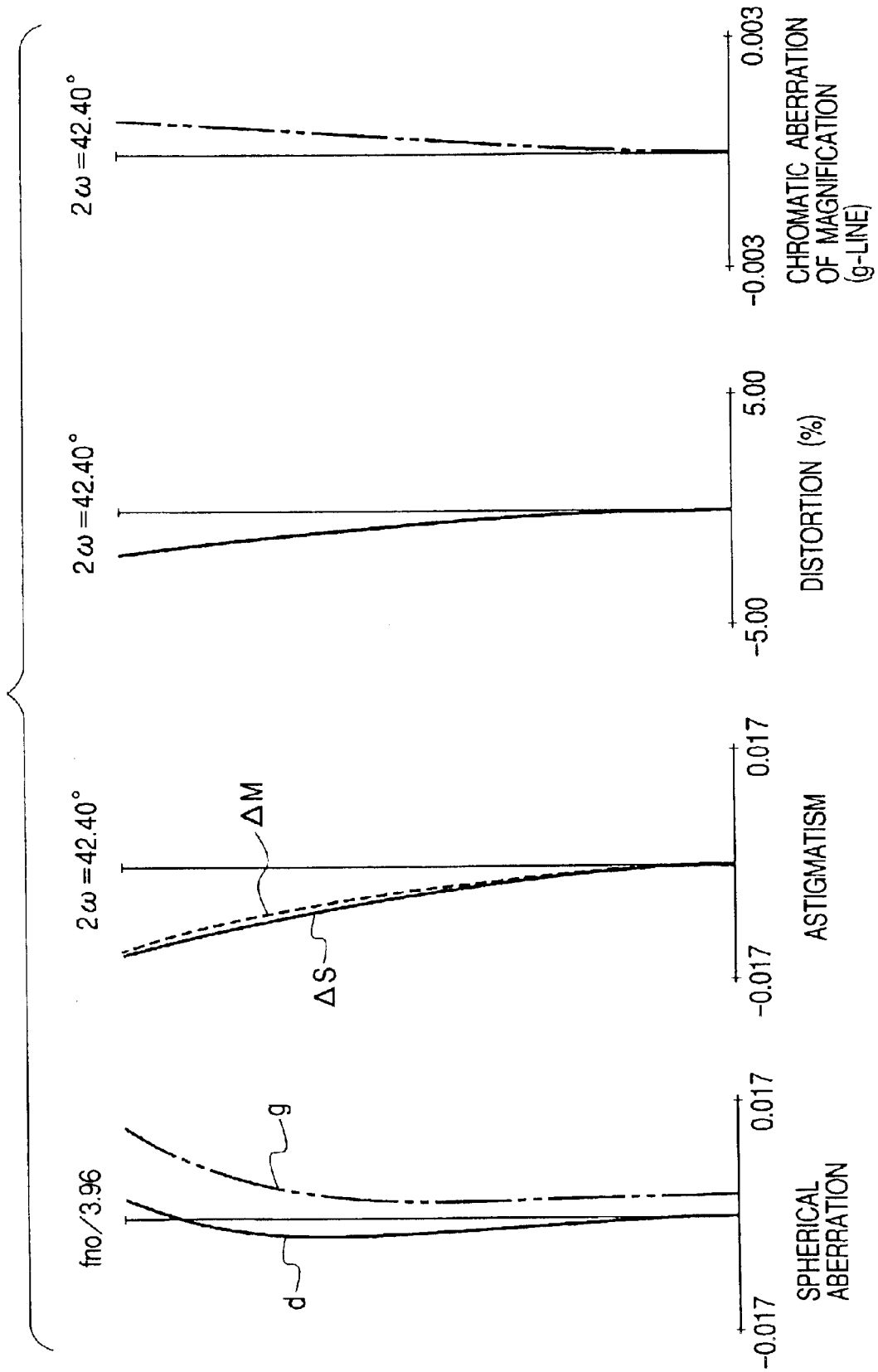
FIG. 3 shows aberrations at the intermediate focal position of the zoom lens of Numerical Embodiment 1.
Figure 4:
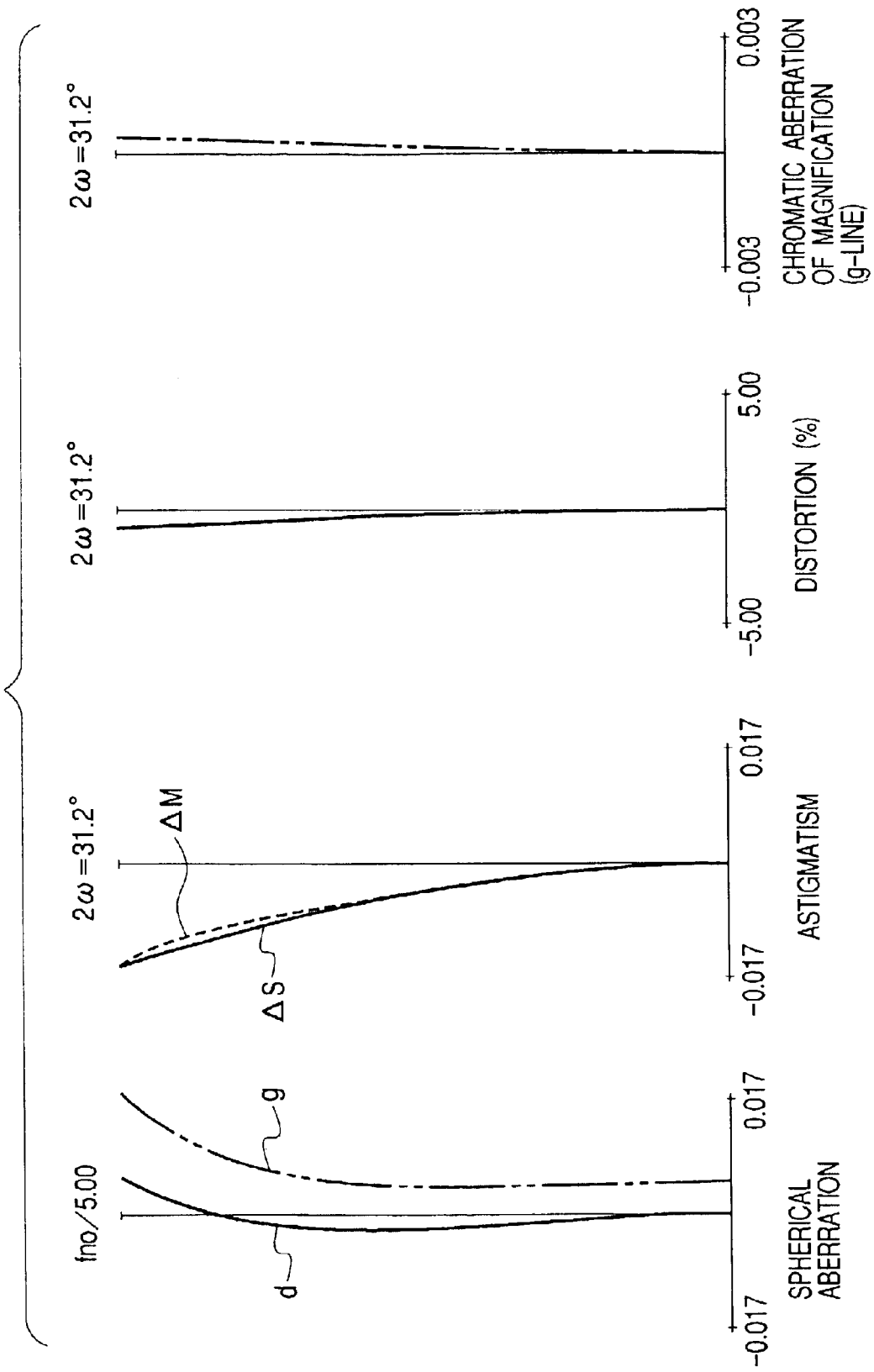
FIG. 4 shows aberrations at the telephoto end of the zoom lens of Numerical Embodiment 1.
Figure 5:
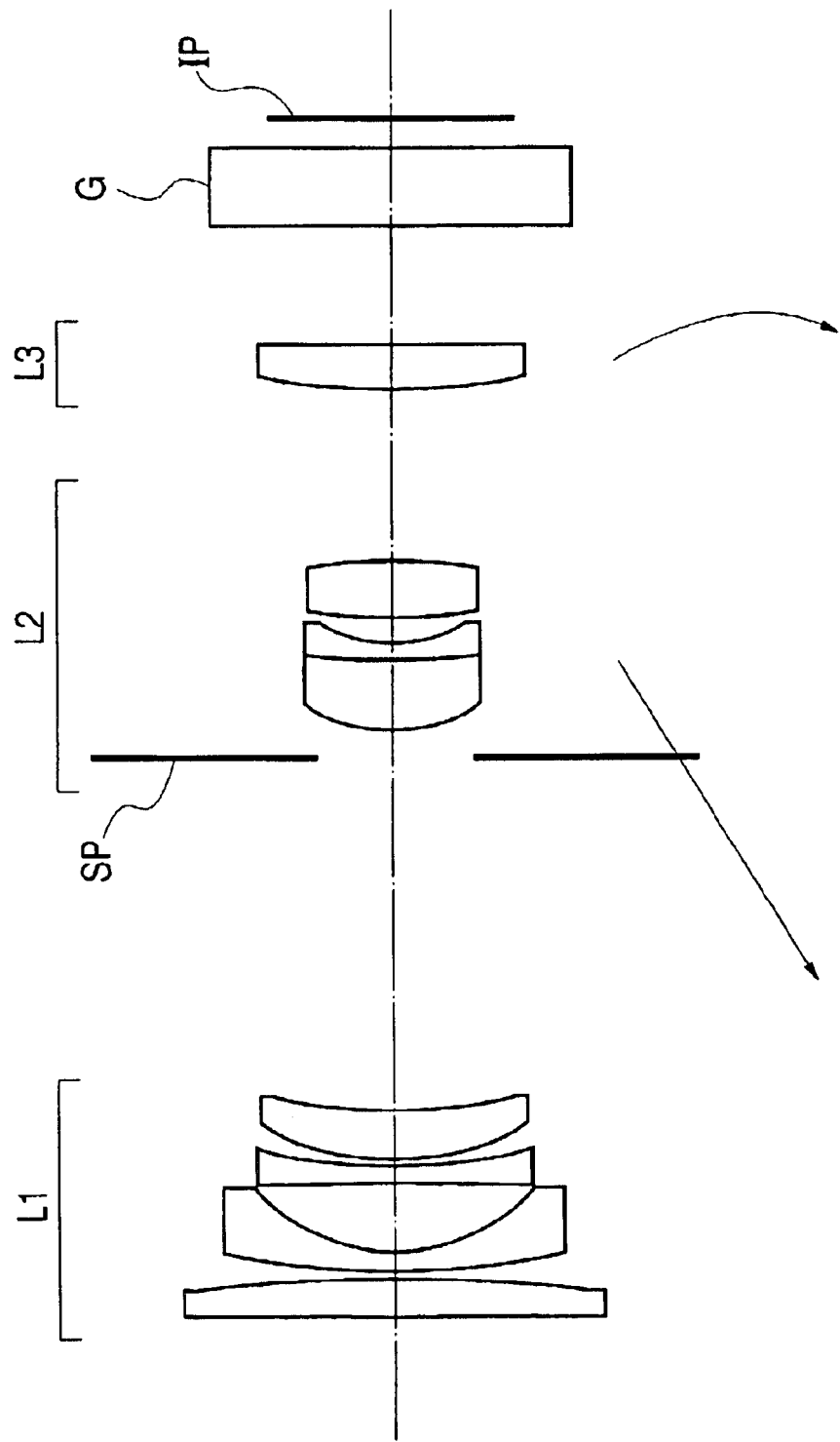
FIG. 5 is an optical cross-sectional view of the zoom lens of Numerical Embodiment 2.
Figure 6:
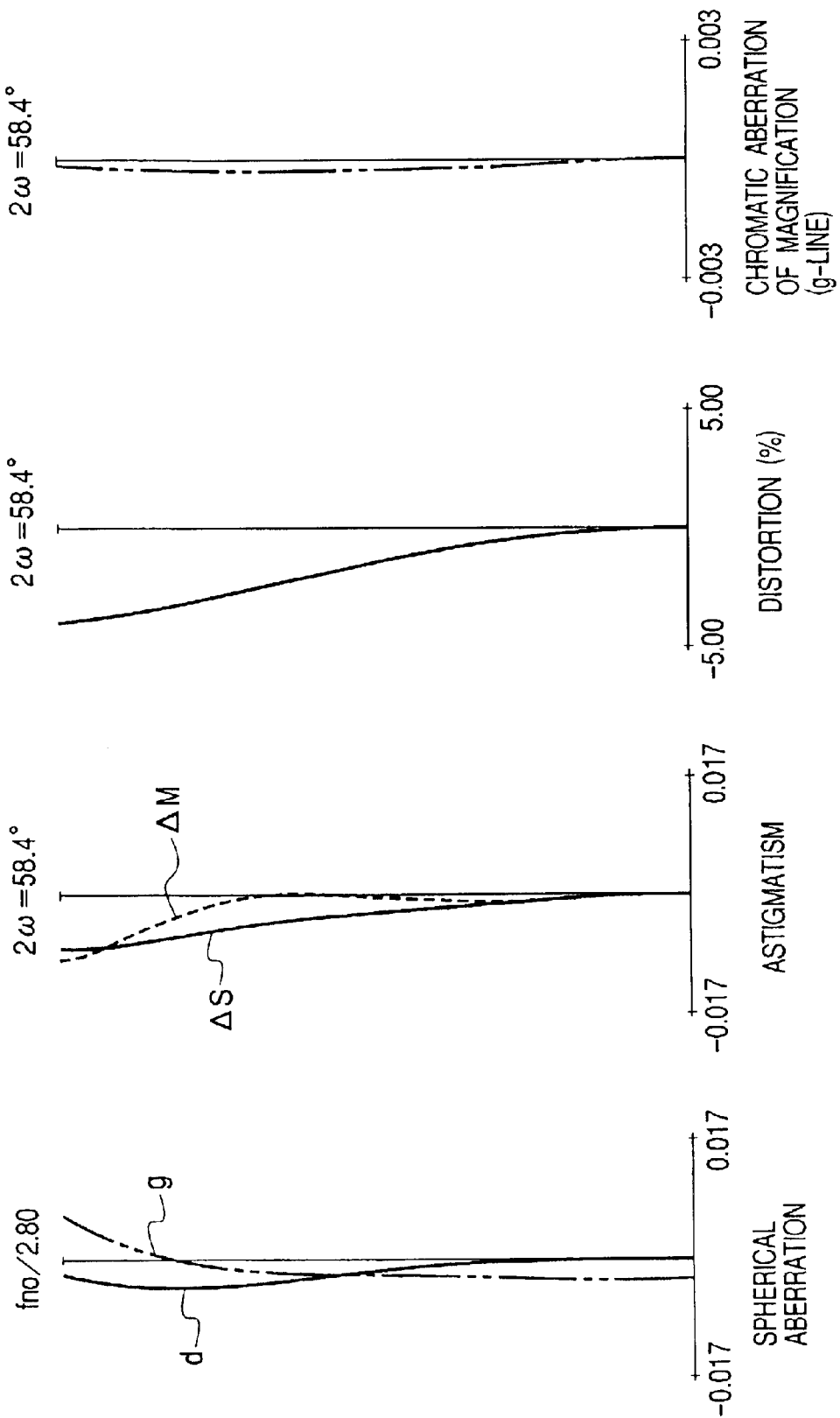
FIG. 6 shows aberrations at the wide angle end of the zoom lens of Numerical Embodiment 2.
Figure 7:
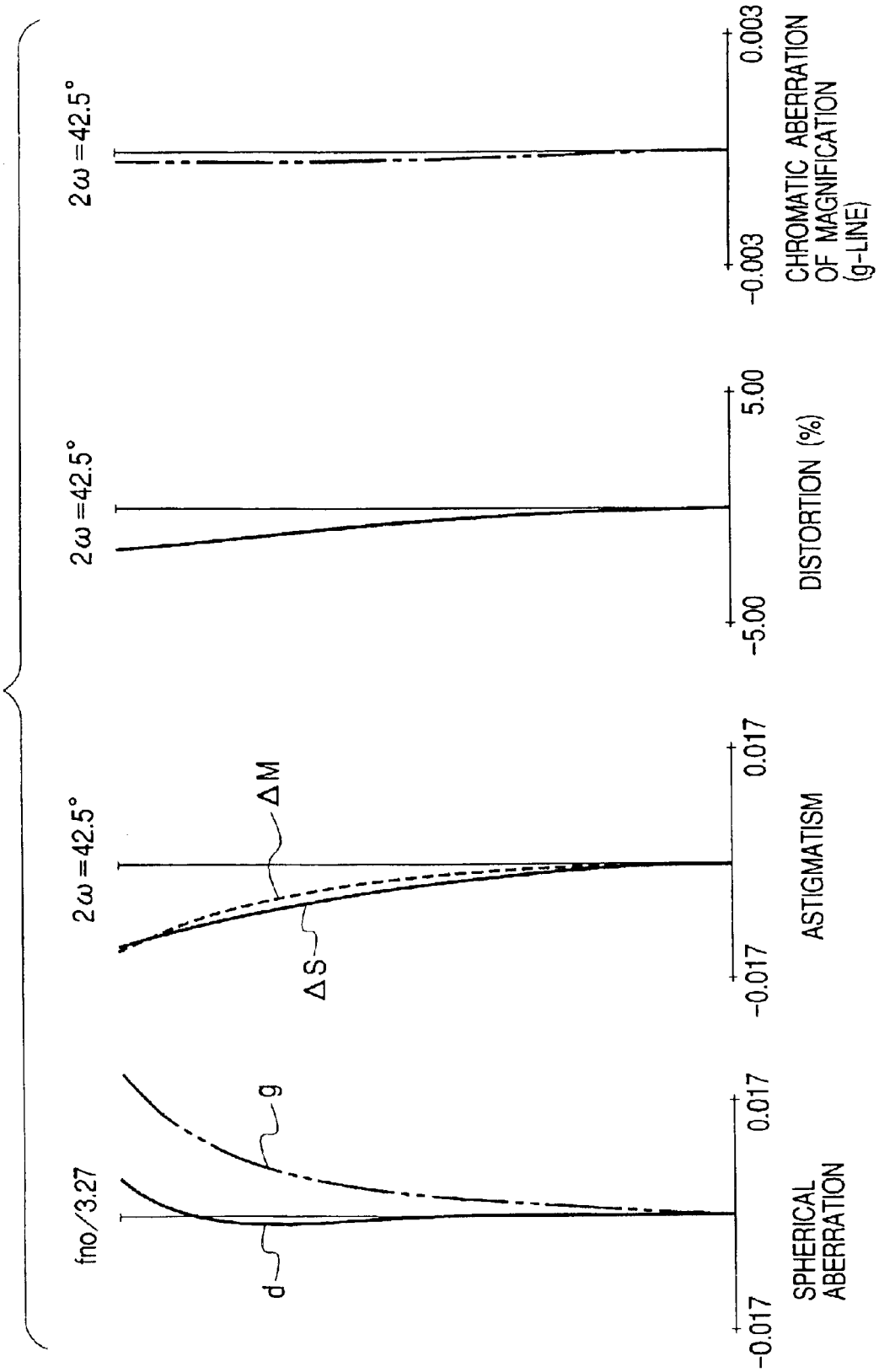
FIG. 7 shows aberrations at the intermediate focal position of the zoom lens of Numerical Embodiment 2.
Figure 8:
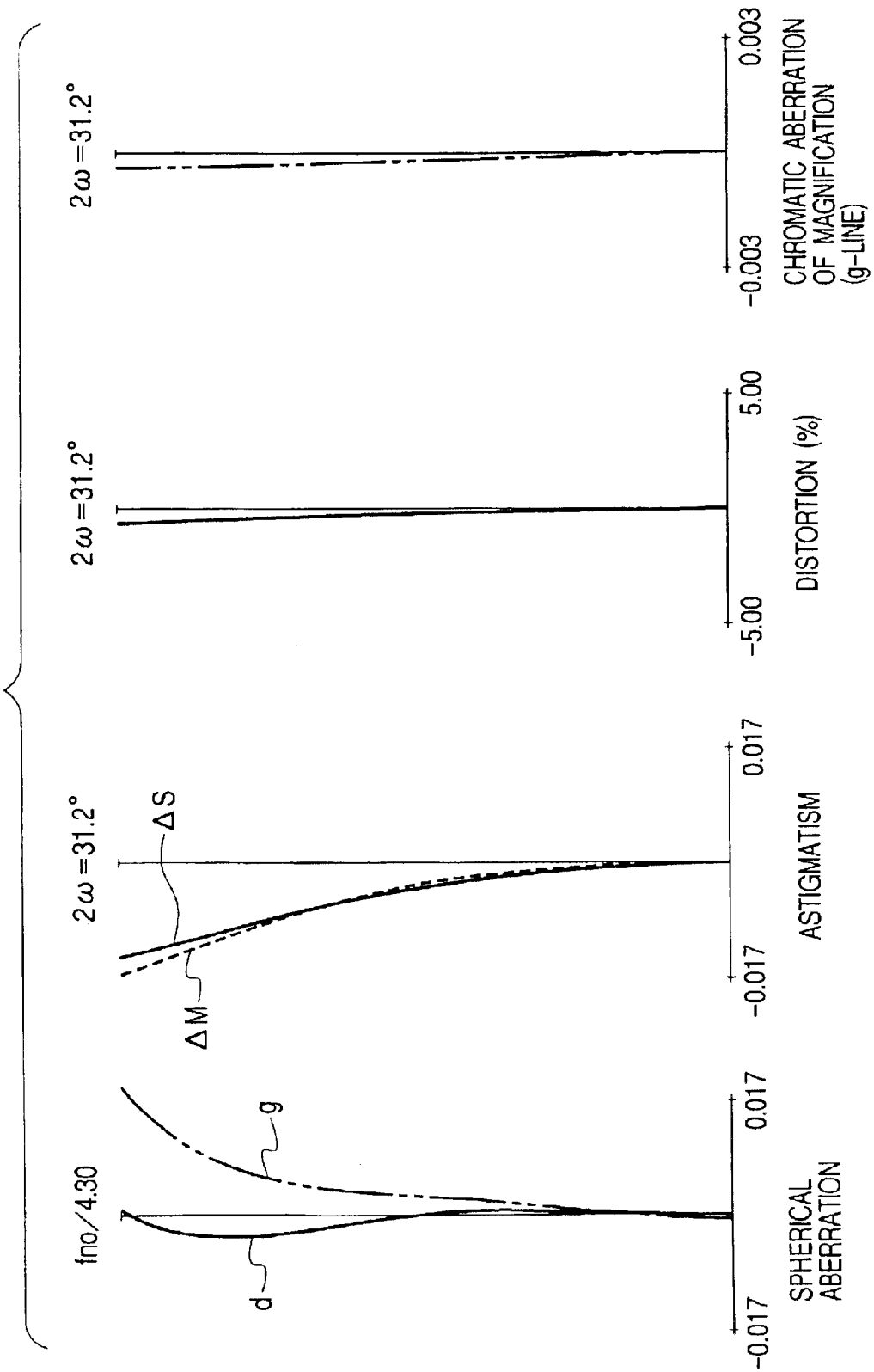
FIG. 8 shows aberrations at the telephoto end of the zoom lens of Numerical Embodiment 2.
Figure 9:
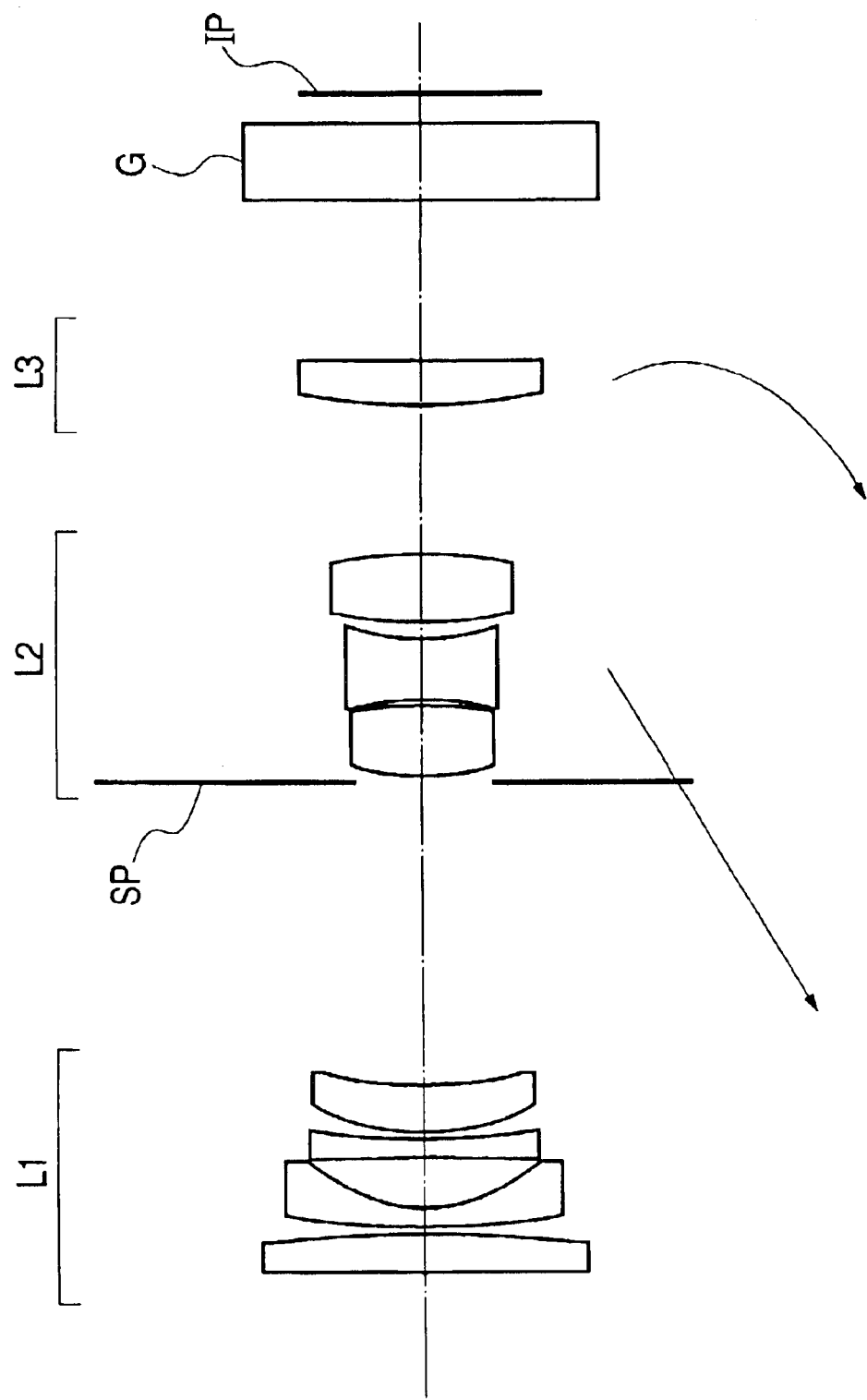
FIG. 9 is an optical cross-sectional view of the zoom lens of Numerical Embodiment 3.
Figure 10:
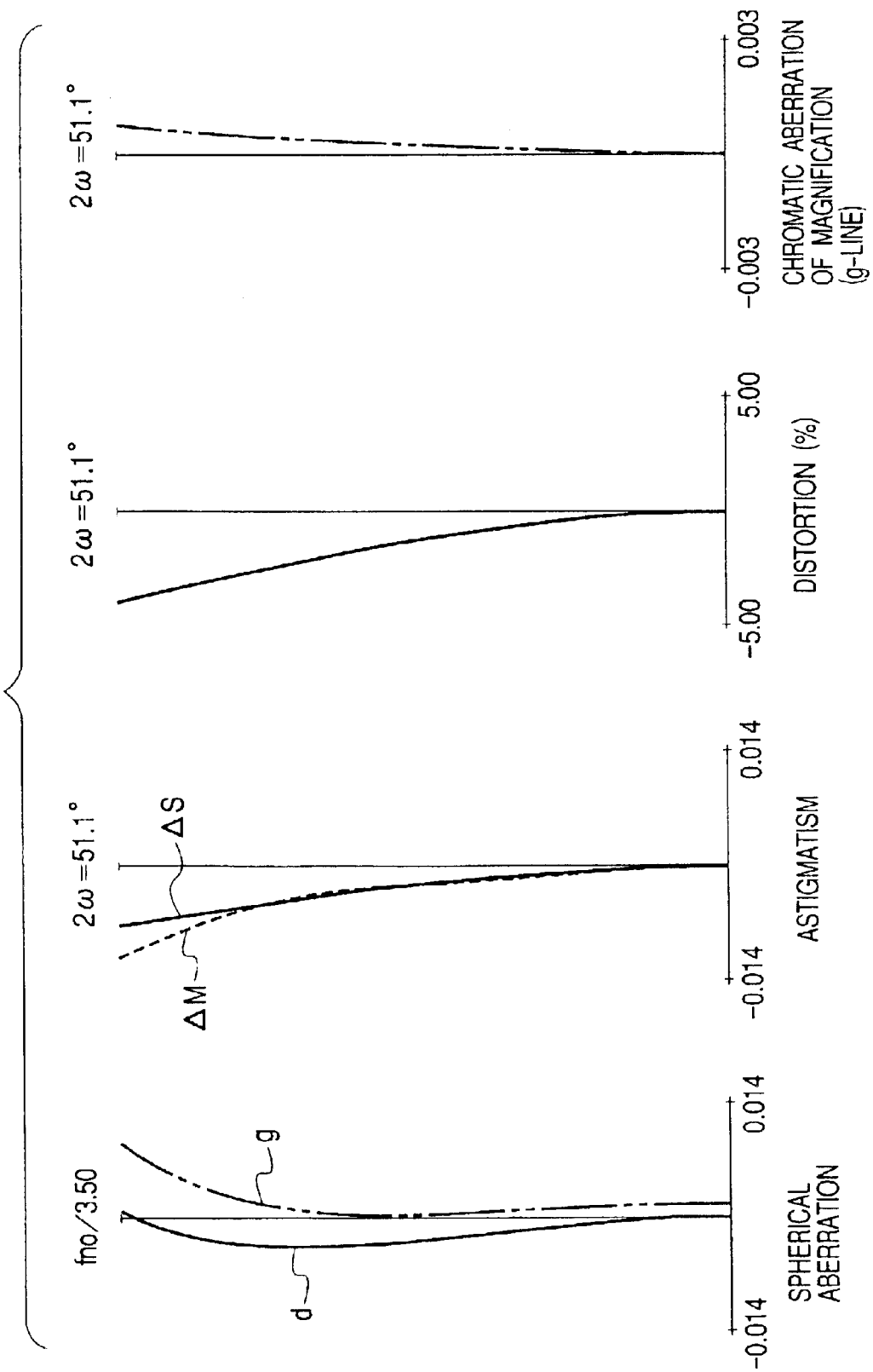
FIG. 10 shows aberrations at the wide angle end of the zoom lens of Numerical Embodiment 3.
Figure 11:
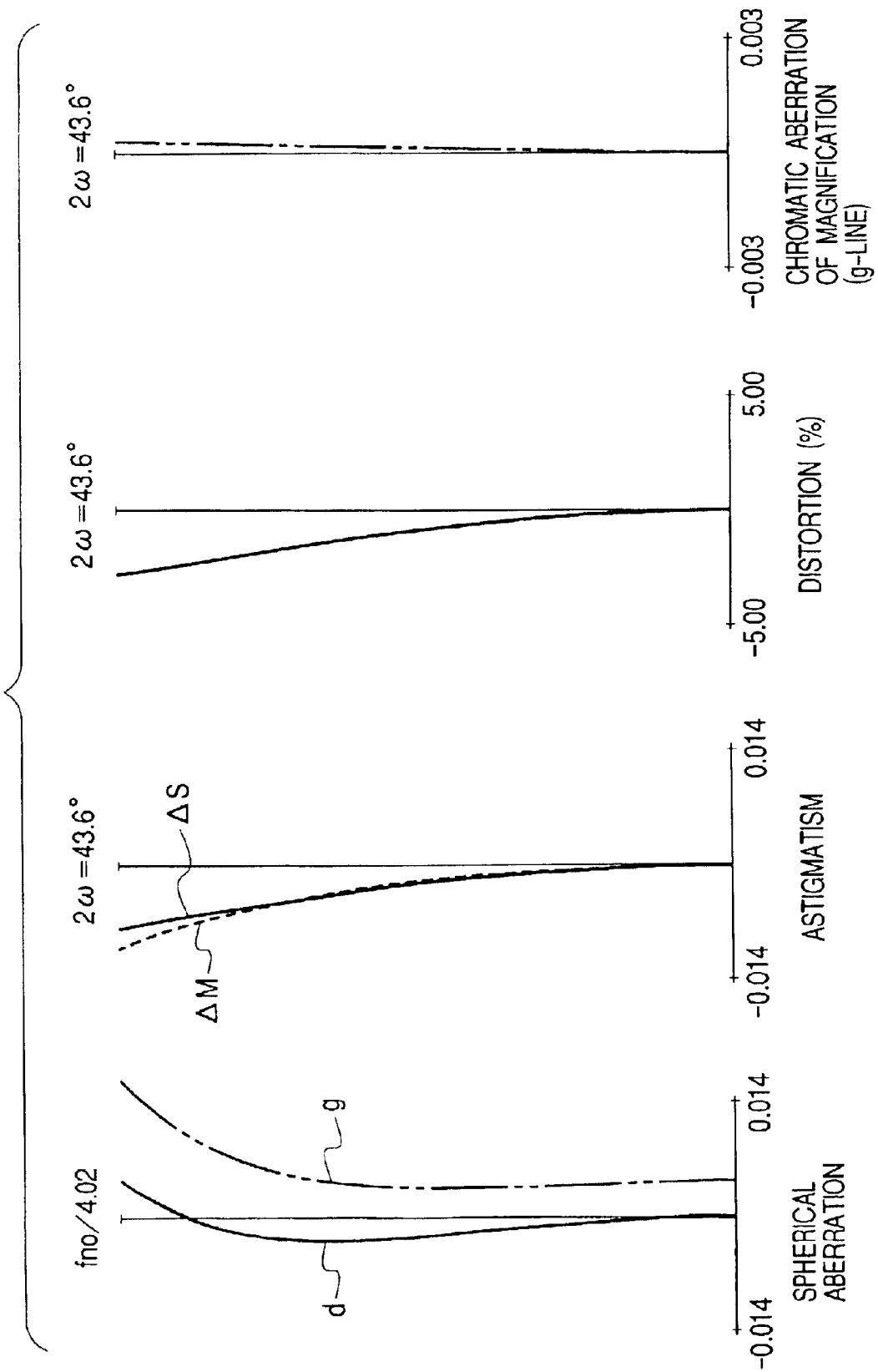
FIG. 11 shows aberrations at the intermediate focal position of the zoom lens of Numerical Embodiment 3.
Figure 12:
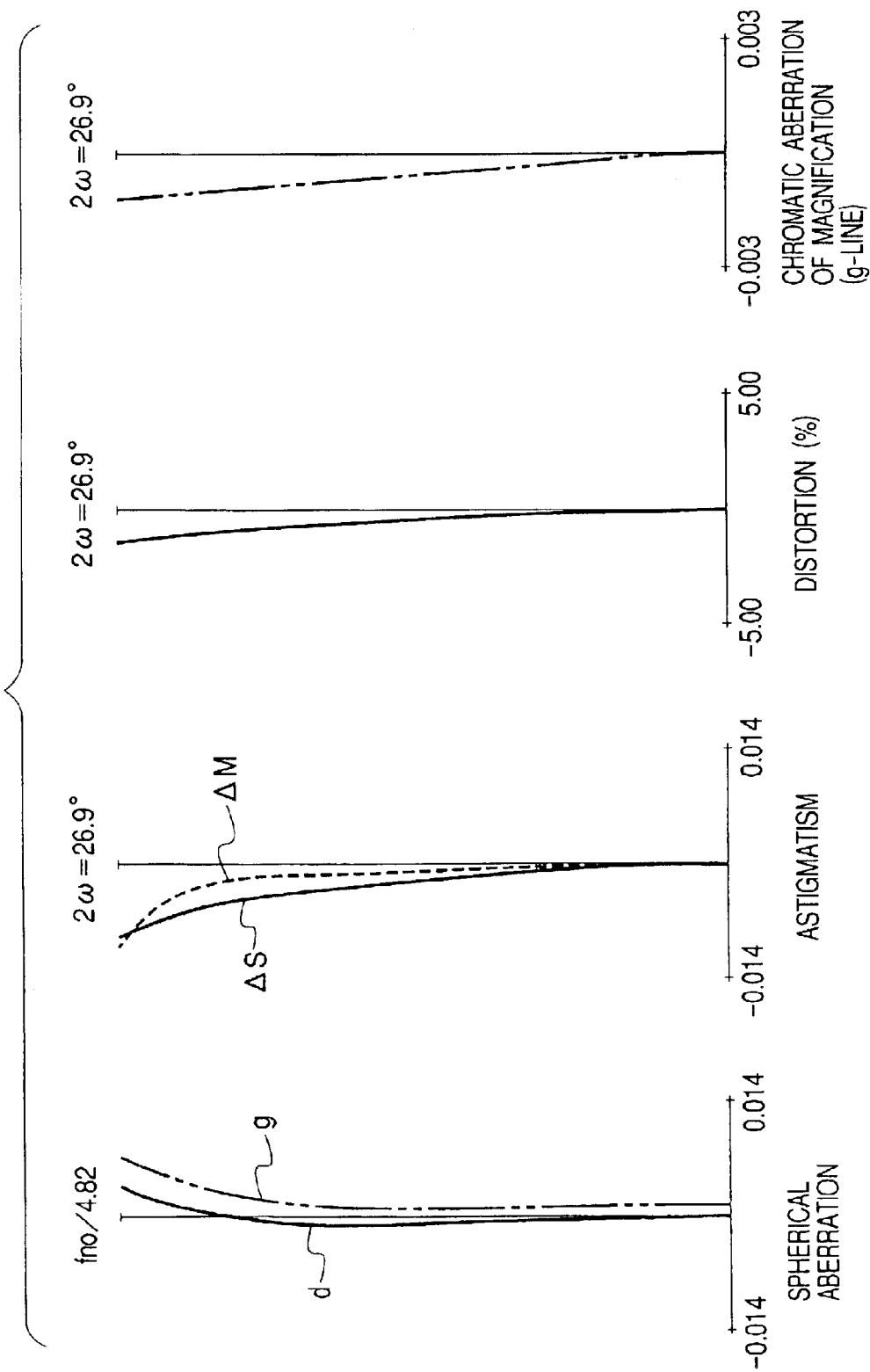
FIG. 12 shows aberrations at the telephoto end of the zoom lens of Numerical Embodiment 3.
Figure 13:
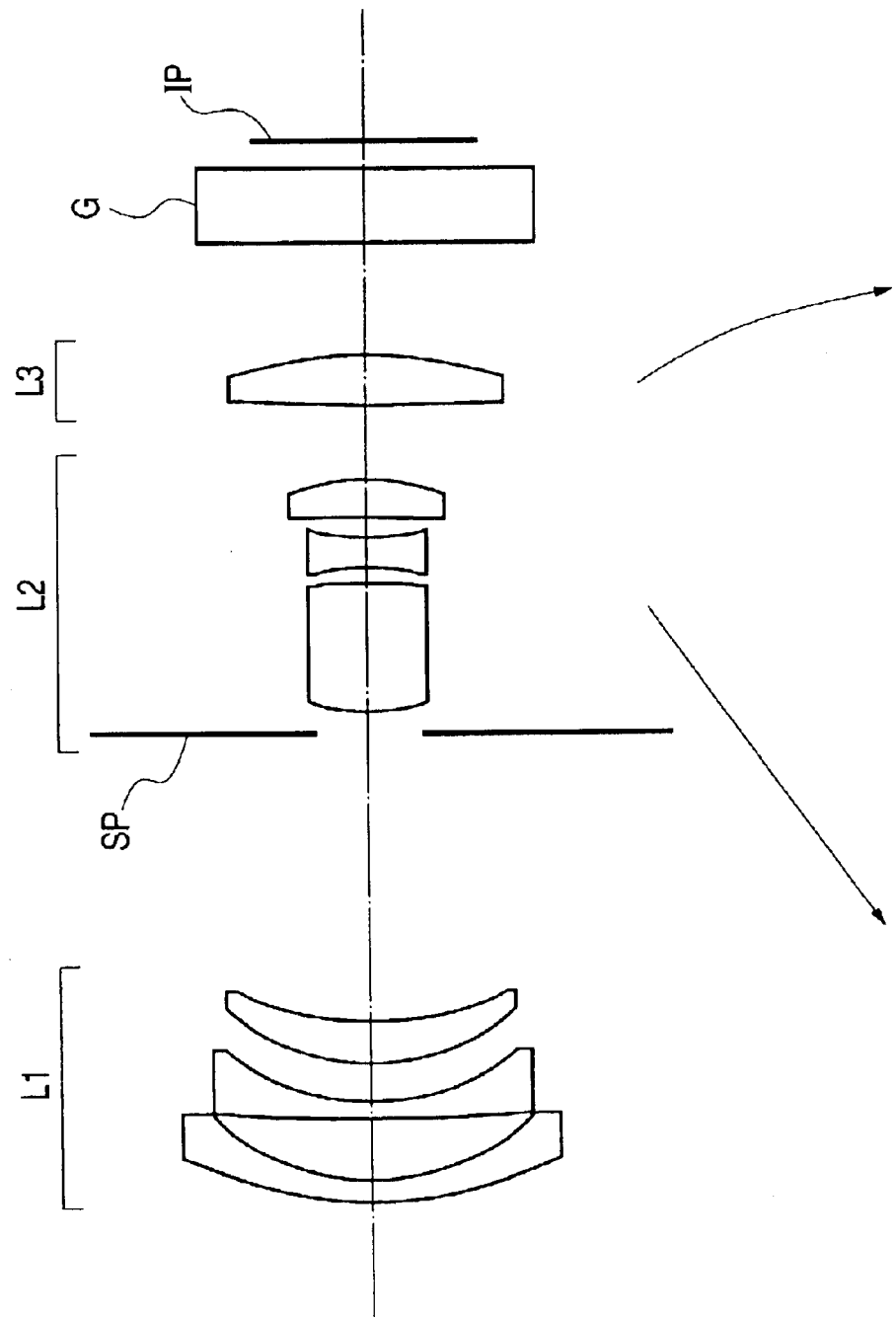
FIG. 13 is an optical cross-sectional view of the zoom lens of Numerical Embodiment 4.
Figure 14:
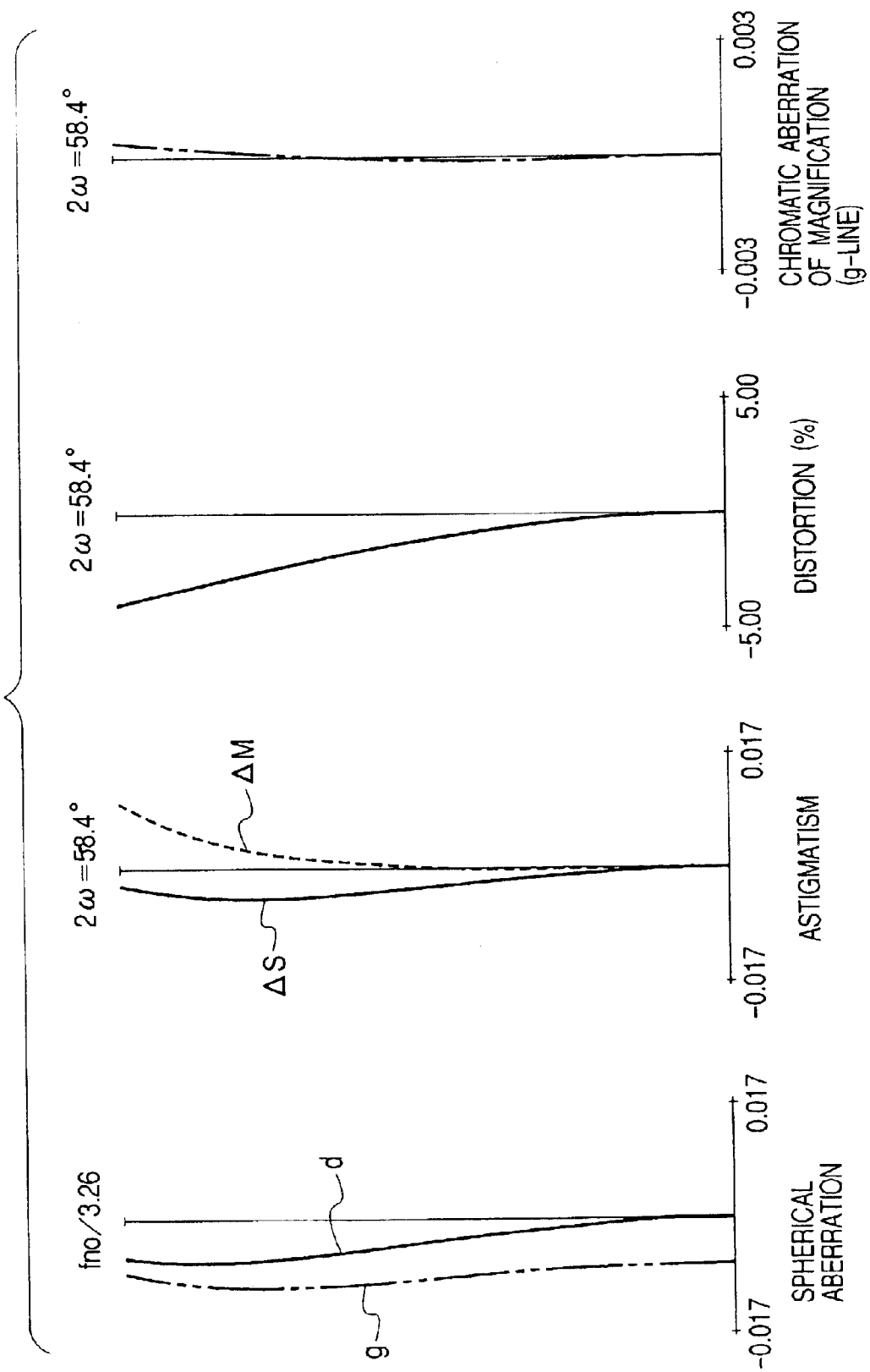
FIG. 14 shows aberrations at the wide angle end of the zoom lens of Numerical Embodiment 4.
Figure 15:
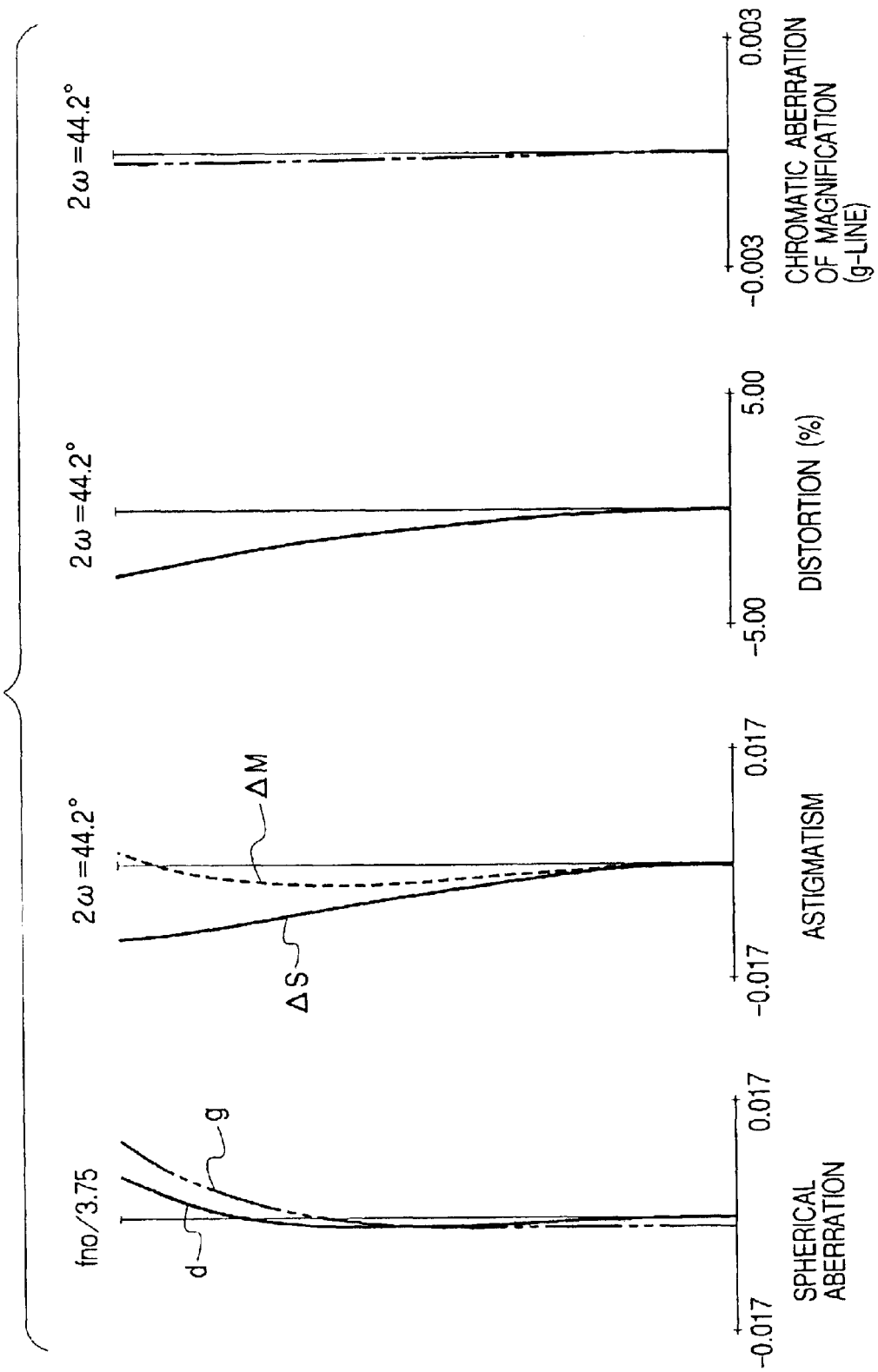
FIG. 15 shows aberrations at the intermediate focal position of the zoom lens of Numerical Embodiment 4.
Figure 16:
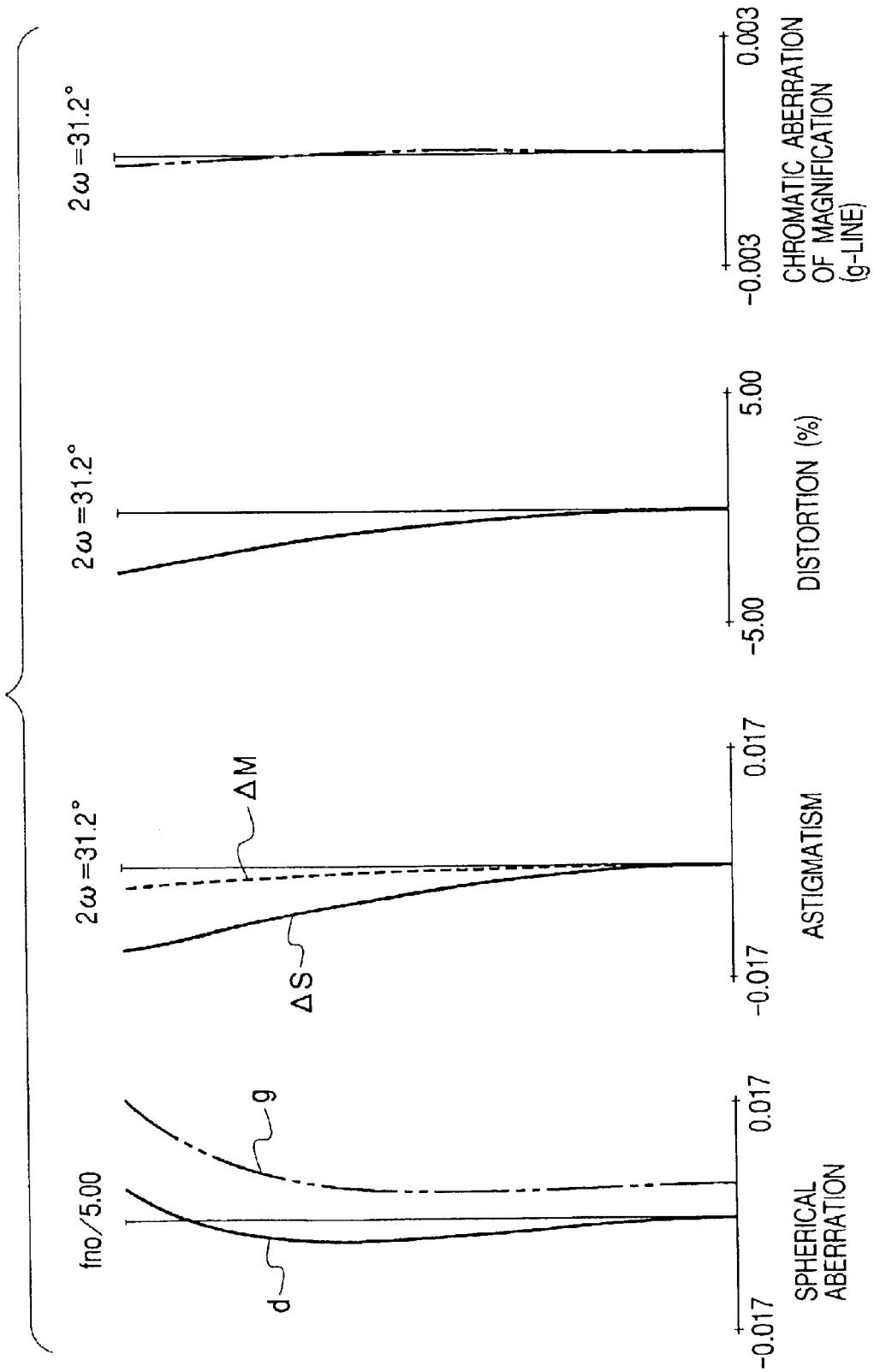
FIG. 16 shows aberrations at the telephoto end of the zoom lens of Numerical Embodiment 4.

Some embodiments of the zoom lens system of the present invention and an image pickup apparatus using the same will hereinafter be described with reference to the drawings.

FIGS. 1, 5, 9 and 13 show the zoom lenses of the present embodiment and correspond to those shown in Numerical Embodiments 1 to 4 which will be described later.

FIGS. 2 to 4, 6 to 8, 10 to 12 and 14 to 16 show the various aberrations of the zoom lenses of FIGS. 1, 5, 9 and 13, respectively, and FIGS. 2, 6, 10 and 14 correspond to the wide angle end (short focal length end), FIGS. 3, 7, 11 and 15 correspond to the intermediate focal length position, and FIGS. 4, 8, 12 and 16 correspond to the telephoto end (long focal length end).

In FIGS. 1, 5, 9 and 13, the zoom lenses of the present embodiment have, in succession from the object side (front) to the image side (rear), three lens units, i.e., a first lens unit L1 of negative refractive power (optical power=the inverse number of a focal length), a second lens unit L2 of positive refractive power and a third lens unit L3 of positive refractive power. An aperture stop SP is disposed between the first lens unit L1 and the second lens unit L2. Rearwardly of the zoom lens, there are provided a glass block G provided in design correspondingly to an optical low-pass filter, a color filter, a face plate or the like, and a solid state image pickup device (photoelectric converting element) comprised of a CCD sensor, a CMOS sensor or the like and provided with a photosensitive surface IP for receiving an image formed by the zoom lens.

In the zoom lenses of the present embodiment, in case of zooming form the wide angle end to the telephoto end, the first lens unit L1 is not moved (stationary), the second lens unit L2 is moved to the object side, and the third lens unit L3 is moved along the locus which is convex toward the image side or a part of this locus. In case of the zooming, the aperture stop SP is moved integrally with the second lens unit L2.

That is, a magnification variation is effected by the movement of the second lens unit L2 of positive refractive power, and the movement of an image point resulting from the magnification variation is corrected by the movement of the third lens unit L3 of positive refractive power. Focusing is also effected by the movement of the third lens unit L3. Thereby the number of the movable lens units is minimized, and a mechanical construction accompanying driving is simplified, whereby the downsizing of a lens barrel is achieved.

Also, by the third lens unit L3 being made to have positive refractive power, the third lens unit L3 is given the role of a field lens to thereby achieve telecentric imaging on the image side particularly necessary in a photographing apparatus using a solid state image pickup device or the like.

Also, that lens in the second lens unit L2 which is most adjacent to the object side is of a shape provided with a convex surface on the object side so that an off-axial principal ray emerging from the first lens unit L1 may not be greatly refracted to thereby generate off-axial aberrations. In order also to suppress the amount of generation of spherical aberration for an on-axial beam emerging from the first lens unit L1 in a divergent state, it is preferable that that lens in the second lens unit L2 which is most adjacent to the object side be of a shape provided with a convex surface on the object side.

Further, in the zoom lenses of the present embodiment, a negative lens provided with a concave surface on the image side is disposed in the second lens unit L2. In the zoom lenses of the present embodiment, as previously described, the third lens unit L3 is given the action of a field lens, but to keep the exit pupil sufficiently away from the image plane, it is necessary to make an off-axial beam enter the third lens unit L3 in a state separate from the optical axis to a certain degree and thereafter bend it by the third lens unit L3. Taking this into consideration, at the telephoto end, the internal between the stop SP and the third lens unit L3 is great and therefore, it is easy to make the off-axial beam enter the third lens unit L3 separately from the optical axis, but at the wide angle end, the internal between the stop SP and the third lens unit L3 is small and therefore, it is necessary to give the second lens unit L2 such action as will separate the off-axial beam from the optical axis.

Particularly if an attempt is made to shorten the internal between the second lens unit L2 and the third lens unit L3 in order to shorten the full length while keeping the exit pupil away from the image plane IP, it is necessary to make both of the refractive power of the concave surface facing the image side of the second lens unit L2 and the positive refractive power of the image side from the concave surface great. Here, to make the off-axial performance good, it is preferable to share particularly the positive refractive power of the image side from the concave surface by a plurality of lenses and minimize the occurrence of aberrations. In the present embodiment, this is realized by sharing the positive refractive power of the image side from the negative lens of the second lens unit L2 by a positive lens disposed on the image side in the second lens unit L2 and the third lens unit L3.

Also, in the present embodiment, the third lens unit L3 is constituted by a positive lens. Thereby, not only the focusing lens unit is lightly constructed and quick focusing becomes possible, but also electric power necessary for driving can be suppressed and therefore, there is a merit also in the saving of electric power.

Further, it is preferable that the zoom lenses of the present embodiment satisfy the following conditional expressions:

$$0.7 < (e12t + e23t)/(e12w + e23w) < 1.4 \tag{1}$$

$$-0.2 < Rn/Rp < 0.5 \tag{2}$$

$$0.2 < |f2n|/f2 < 0.7 \tag{3}$$

$$2.0 < f3/fw < 4.5 \tag{4}$$

where e12w is the internal between the first lens unit L1 and the second lens unit L2 at the wide angle end, e23w is the internal between the second lens unit L2 and the third lens unit L3 at the wide angle end, e12t is the interval between the first lens unit L1 and the second lens unit L2 at the telephoto end, e23t is the interval between the second lens unit L2 and the third lens unit L3 at the telephoto end, Rn is the radius of curvature of the image side surface of the negative lens in the second lens unit L2, Rp is the radius of curvature of the object side surface of the positive lens located on the image side of the negative lens in the second lens unit L2, f2n is the focal length of the negative lens in the second lens unit L2, f2 is the focal length of the second lens unit L2, f3 is the focal length of the third lens unit L3, and fw is the focal length of the entire system at the wide angle end.

Conditional expression (1) is an expression which prescribes the movement of the third lens unit L3 during zooming. When the third lens unit is brought to the same position at the wide angle end and the telephoto end by the complete reciprocal movement thereof, conditional expression (1) becomes 1. In the present embodiment, conditional expression (1) prescribes the movement of the third lens unit L3 by a range including 1. When beyond the upper limit of conditional expression (1), the third lens unit L3 is greatly moved in the direction of the image side from the wide angle end toward the telephoto end, the fluctuation of the exit pupil becomes great and therefore, when it is supposed to form an image on the solid state image pickup device, it becomes impossible to obtain a good image in the entire zoom area, and this is not good. Also, when beyond the lower limit of conditional expression (1), the third lens unit L3 is greatly moved in the direction of the object from the wide angle end toward the telephoto end, the third lens unit L3 requires an amount of movement equal to the sum of the movement for zooming and the amount of axial movement for close range focusing at the telephoto end. Consequently, the shaft length for driving the third lens unit L3 in the direction of the optical axis is increased, and this is disadvantageous in respect of the downsizing of the lens barrel.

Conditional expression (2) is an expression which prescribes the shape of an air lens constituted by a concave surface in the second lens unit L2 facing the image side and a convex surface adjacent thereto. If the radius of curvature of the concave surface is too great beyond upper limit of conditional expression (2), the refractive power of the concave surface is too small and it becomes difficult to sufficiently keep the exit pupil away from the image plane, and this is not good. Also, if the radius of curvature of the concave surface is too small beyond the lower limit of the conditional expression (2), the difference between the angles of incidence of the upper marginal ray and lower marginal ray of an off-axial beam in this surface becomes great and particularly the occurrence of off-axial coma becomes remarkable, and this is not good.

Conditional expression (3) is an expression which prescribes the refractive power of the negative lens of the second lens unit L2. If the refractive power of the negative lens is small beyond the upper limit of conditional expression (3), Petzval sum becomes great to the positive and therefore curvature of image field becomes great to the under side, and this is not good. If the refractive power of the negative lens is great beyond the lower limit of conditional expression (3), the back focal distance becomes long, and this is not good in respect of compactness.

Conditional expression (4) is an expression which prescribes the refractive power of the third lens unit L3. If the refractive power of the third lens unit L3 is small beyond the upper limit of conditional expression (4), the amount of movement of the third lens unit L3 for correcting the movement of the image point resulting from a magnification variation becomes great, and this is not good in respect of compactness. Particularly when focusing is effected by the third lens unit L3, it is necessary to secure a stroke corresponding to the amount of axial movement during a short distance as the amount of movement of the third lens unit L3, and this poses a problem. If the refractive power of the third lens unit L3 is great beyond the lower limit of conditional expression (4), when the third lens unit L3 is constituted by a lens, Petzval sum becomes great to the positive and curvature of image field becomes great to the under side, and this is not good. It also poses a problem that the occurrence of transverse chromatic aberration becomes remarkable over the entire zoom area.

The values of the respective conditional expression is numerical embodiments will be shown below.

TABLE 1

|  | Embodiment | | | |
| --- | --- | --- | --- | --- |
|  | 1 | 2 | 3 | 4 |
| Conditional Expression (1) | 1.146 | 1.186 | 0.887 | 1.214 |
| Conditional Expression (2) | 0.416 | 0.283 | 0.368 | -0.119 |
| Conditional Expression (3) | 0.401 | 0.574 | 0.395 | 0.325 |
| Conditional Expression (4) | 3.581 | 3.782 | 3.587 | 2.366 |

The numerical data of Numerical Embodiments 1 to 4 will be shown below. In each numerical embodiment, i represents the order of the surfaces from the object side, Ri represents the radius of curvature of the ith surface, Di represents the interval between the ith surface and the (i+1)th surface, and Ni and vi represent the refractive index and Abbe number, respectively, for d-line. Also, the two surfaces most adjacent to the image side are glass blocks G corresponding to rock crystal low-pass filters, infrared cut filters or the like and provided in design. Also, the shape of an aspheric surface, when the displacement in the direction of the optical axis at the position of a height H from the optical axis is defined as X with the surface vertex as the reference, is represented by $$X = \frac{(1/R)H^2}{1+\sqrt{1-(1+k)(H/R)^2}} + BH^4 + CH^6 + DH^8 + EH^{10},$$

where R is the paraxial radius of curvature, B, C, D and E are the coefficients of aspheric surface, and k is a cone constant.

(Numerical Embodiment 1)

| f = 1 to 2.00 | Fno = 3.45 to 5.00 | 2ω = 58.4° to 31.2° | |
| --- | --- | --- | --- |
| R1 = 83.333 | D1 = 0.18 | N1 = 1.712995 | v1 = 53.9 |
| R2 = -7.791 | D2 = 0.03 | | |
| R3 = 3.184 | D3 = 0.09 | N2 = 1.719995 | v2 = 50.2 |
| R4 = 0.815 | D4 = 0.33 | | |
| R5 = -11.429 | D5 = 0.08 | N3 = 1.517417 | v3 = 52.4 |
| R6 = 2.498 | D6 = 0.03 | | |
| R7 = 1.210 | D7 = 0.22 | N4 = 1.846660 | v4 = 23.9 |
| R8 = 2.221 | D8 = Variable | | |
| R9 = stop | D9 = 0.12 | | |
| R10 = 1.080 | D10 = 0.43 | N5 = 1.882997 | v5 = 40.8 |
| R11 = -2.316 | D11 = 0.03 | | |
| R12 = -1.427 | D12 = 0.20 | N6 = 1.761821 | v6 = 26.5 |
| R13 = 0.901 | D13 = 0.05 | | |
| R14 = 2.167 | D14 = 0.38 | N7 = 1.712995 | v7 = 53.9 |
| R15 = -1.951 | D15 = Variable | | |
| R16 = 3.150 | D16 = 0.22 | N8 = 1.696797 | v8 = 55.5 |
| R17 = -11.667 | D17 = Variable | | |
| R18 = ∞ | D18 = 0.37 | N9 = 1.516330 | v9 = 64.1 |
| R19 = ∞ | | | |

| Variable | Focal Length | | |
| --- | --- | --- | --- |
| Distance | 1.000 | 1.41 | 2.0 |
| D8 | 1.526 | 0.96 | 0.3 |
| D15 | 0.541 | 1.38 | 2.0 |
| D17 | 0.655 | 0.37 | 0.3 |

(Numerical Embodiment 2)

| f = 1 to 2.00 | Fno = 2.80 to 4.30 | 2ω = 58.4° to 31.2° | |
| --- | --- | --- | --- |
| R1 = 90.288 | D1 = 0.18 | N1 = 1.772499 | v1 = 49.6 |
| R2 = -7.981 | D2 = 0.03 | | |
| R3 = 3.762 | D3 = 0.09 | N2 = 1.719995 | v2 = 50.2 |
| R4 = 0.833 | D4 = 0.33 | | |
| R5 = -17.355 | D5 = 0.08 | N3 = 1.531717 | v3 = 48.8 |
| R6 = 2.279 | D6 = 0.03 | | |
| R7 = 1.190 | D7 = 0.22 | N4 = 1.846660 | v4 = 23.9 |
| R8 = 2.143 | D8 = Variable | | |
| R9 = stop | D9 = 0.12 | | |
| R10 = 0.704 | D10 = 0.33 | N5 = 1.743300 | v5 = 49.3 |
| R11 = 4.237 | D11 = 0.08 | N6 = 1.761821 | v6 = 26.5 |
| R12 = 0.631 | D12 = 0.12 | | |
| R13 = 2.227 | D13 = 0.27 | N7 = 1.772499 | v7 = 49.6 |
| R14 = -2.940 | D14 = Variable | | |
| R15 = 2.923 | D15 = 0.22 | N8 = 1.603112 | v8 = 60.6 |
| R16 = -10.087 | D16 = Variable | | |
| R17 = ∞ | D17 = 0.37 | N9 = 1.516330 | v9 = 64.1 |
| R18 = ∞ | | | |

-continued

| Variable | Focal Length | | |
|---|---|---|---|
| Distance | 1.00 | 1.41 | 2.0 |
| D8 | 1.66 | 1.13 | 0.57 |
| D14 | 0.82 | 1.70 | 2.37 |
| D16 | 0.55 | 0.19 | 0.09 |

Coefficient of Aspheric Surface
R10 k = −4.00112e−02    B = −1.31120e−01    C = −7.96954e−02
D = −6.50977e−01    E = 0.00000e+00

(Numerical Embodiment 3)

f = 1 to 2.00    Fno = 3.50 to 4.82    2ω = 51.1° to 26.9°
R1 = 71.428    D1 = 0.15    N1 = 1.712995    ν1 = 53.9
R2 = −5.844    D2 = 0.03
R3 = 3.723    D3 = 0.08    N2 = 1.719995    ν2 = 50.2
R4 = 0.685    D4 = 0.21
R5 = −9.539    D5 = 0.07    N3 = 1.517417    ν3 = 52.4
R6 = 2.897    D6 = 0.03
R7 = 0.991    D7 = 0.19    N4 = 1.846660    ν4 = 23.9
R8 = 1.762    D8 = Variable
R9 = stop    D9 = 0.01
R10 = 0.974    D10 = 0.29    N5 = 1.882997    ν5 = 40.8
R11 = −1.815    D11 = 0.02
R12 = −1.225    D12 = 0.26    N6 = 1.761821    ν6 = 26.5
R13 = 0.820    D13 = 0.07
R14 = 2.229    D14 = 0.29    N7 = 1.712995    ν7 = 53.9
R15 = −1.672    D15 = Variable
R16 = 3.307    D16 = 0.19    N8 = 1.696797    ν8 = 55.5
R17 = −10.000    D17 = Variable
R18 = ∞    D18 = 0.31    N9 = 1.516330    ν9 = 64.1
R19 = ∞

| Variable | Focal Length | | |
|---|---|---|---|
| Distance | 1.00 | 1.43 | 2.0 |
| D8 | 1.24 | 0.71 | 0.13 |
| D15 | 0.61 | 1.28 | 1.52 |
| D17 | 0.66 | 0.52 | 0.87 |

(Numerical Embodiment 4)

f = 1 to 2.00    Fno = 3.26 to 5.00    2ω = 58.4° to 31.2°
R1 = 2.064    D1 = 0.10    N1 = 1.603112    ν1 = 60.6
R2 = 1.126    D2 = 0.31
R3 = 11.174    D3 = 0.08    N2 = 1.487490    ν2 = 70.2
R4 = 1.088    D4 = 0.19
R5 = 1.042    D5 = 0.21    N3 = 1.834000    ν3 = 37.2
R6 = 1.502    D6 = Variable
R7 = stop    D7 = 0.12
R8 = 1.030    D8 = 0.64    N4 = 1.882997    ν4 = 40.8
R9 = −2.658    D9 = 0.08
R10 = −0.921    D10 = 0.15    N5 = 1.846660    ν5 = 23.9
R11 = 1.216    D11 = 0.11
R12 = −10.234    D12 = 0.19    N6 = 1.834807    ν6 = 42.7
R13 = −0.994    D13 = Variable
R14 = 8.570    D14 = 0.26    N7 = 1.696797    ν7 = 55.5
R15 = −2.016    D15 = Variable
R16 = ∞    D16 = 0.37    N8 = 1.516330    ν8 = 64.1
R17 = ∞

| Variable | Focal Length | | |
|---|---|---|---|
| Distance | 1.00 | 1.38 | 2.00 |
| D6 | 1.44 | 0.91 | 0.33 |
| D13 | 0.37 | 1.10 | 1.87 |
| D15 | 0.57 | 0.37 | 0.18 |

An embodiment of a digital still camera using the zoom lens of the present invention as a photographing optical system will now be described with reference to FIG. 17.

Figure 17:
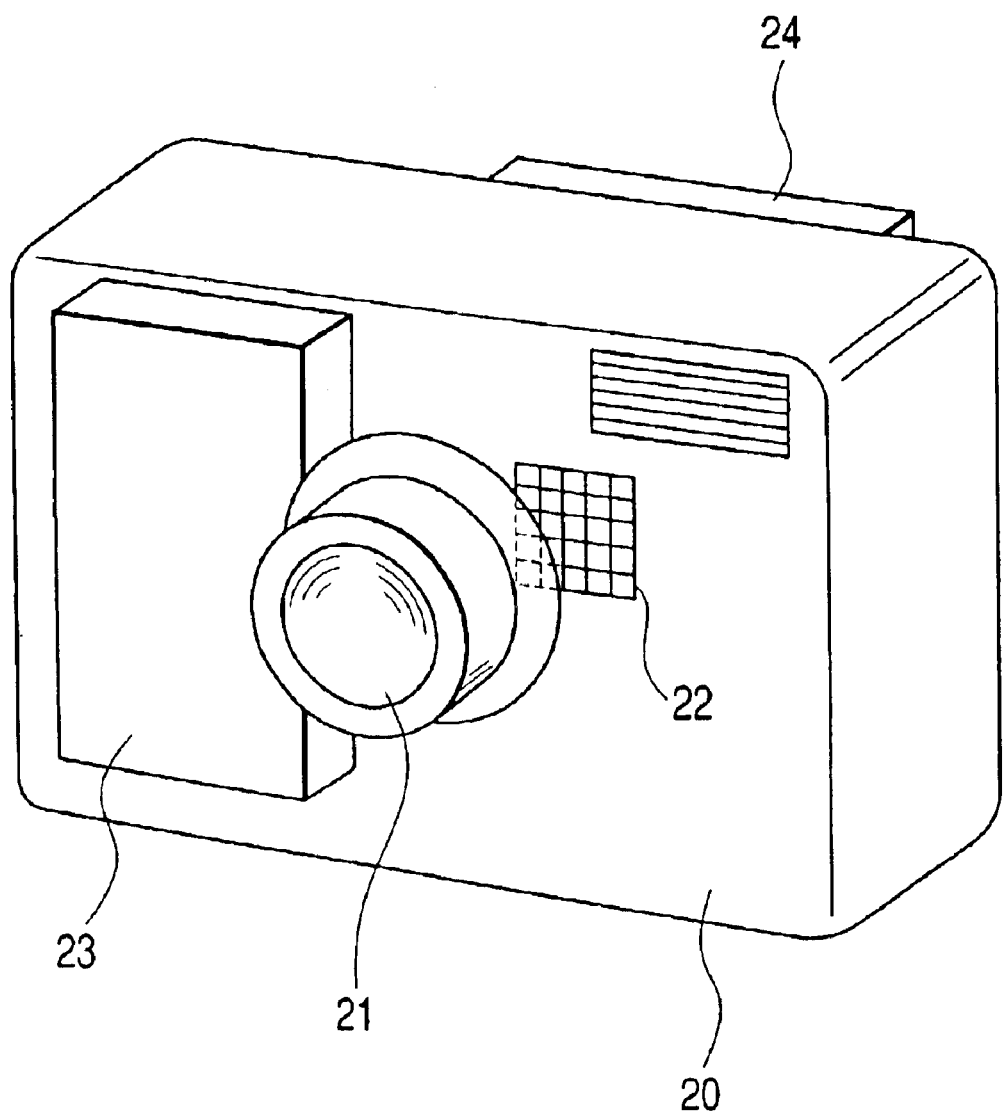
FIG. 17 is a schematic view of the essential portions of a digital still camera provided with the zoom lens of the present invention.

In FIG. 17, the reference numeral 20 designates a camera main body, the reference numeral 21 denotes a photographing optical system constituted by the zoom lens of one of Numerical Embodiments 1 to 4, the reference numeral 22 designates a solid state image pickup device (photoelectric converting element) such as a CCD sensor or a CMOS sensor for receiving an object image formed by the photographing optical system 21, the reference numeral 23 denotes a memory for recording information corresponding to the object image photoelectrically converted by the solid state image pickup device 22, and the reference numeral 24 designates a finder constituted by a liquid crystal display panel or the like and for observing therethrough the object image formed on the solid state image pickup device 22.

By applying the zoom lens of the present invention to an optical apparatus such as a digital still camera as described above, it is possible to realize a compact optical apparatus having high optical performance.

What is claimed is:

1. A zoom lens system comprising, in succession from front to rear, with:

a first lens unit of negative optical power having a negative lens of which a rear surface is a concave surface, and a positive lens of which a front surface is a convex surface;

a second lens unit of positive optical power having a negative lens of which a rear surface is a concave surface, and a positive lens disposed rearwardly of said negative lens; and a third lens unit of positive optical power;

wherein in case of zooming from a short focal length end to a long focal length end, said second lens unit forwardly moves, said third lens unit moves along the locus which is convex toward the rear side or a part of it, said first lens unit does not move for zooming, said third lens unit is located rearmostly at other zoom position than the short focal length end, and the following condition is satisfied:

$$0.7 < (e12t + e23t)/(e12w + e23w) < 1.4,$$

where e12w is an interval between said first lens unit and said second lens unit at the short focal length end, e23w is the interval between said second lens unit and said third lens unit at the short focal length end, e12t is the interval between said first lens unit and said second lens unit at the long focal length end, and e23t is the interval between said second lens unit and said third lens unit at long focal length end.

2. A zoom lens system according to claim 1, wherein further the following condition is satisfied:

$$-0.2 < Rn/Rp < 0.5,$$

where Rn is a radius of curvature of a rear surface of the negative lens in said lens unit, and Rp is the radius of curvature of a front surface of the positive lens in said second lens unit.

3. A zoom lens system according to claim 1, wherein further the following condition is satisfied:

$$0.2 < |f2n|/f2 < 0.7,$$

where f2n is a focal length of the negative lens in said second lens unit, and f2 is the focal length of said second lens unit.

4. A zoom lens system according to claim 1, wherein said third lens unit consists of a positive lens.

5. A zoom lens system according to claim 1, wherein further the following condition is satisfied:

$$2.0 < f3/fw < 4.5,$$

where f3 is a focal length of said third lens unit, and fw is the focal length of the entire system at a wide angle end.

6. A zoom lens system according to claim 1, wherein focusing is effected by said third lens unit being moved.

7. A zoom lens system according to claim 1, wherein said second lens unit has a positive lens disposed forwardly of the negative lens in said second lens unit and of which the front surface is a convex surface.

8. A zoom lens system according to claim 1, which forms an image on a photosensitive surface of a solid state image pickup device.

9. An image pickup apparatus comprising:

a zoom lens system according to claim 1, and a solid state image pickup device for receiving an image formed by said zoom lens system.

* * * * *